Feb. 10, 1959     H. K. STUEBER     2,872,946
THERMAL INSULATION SYSTEM
Filed June 20, 1955

INVENTOR.
HARRY K. STUEBER

United States Patent Office 2,872,946
Patented Feb. 10, 1959

2,872,946
THERMAL INSULATION SYSTEM
Harry K. Stueber, Baltimore, Md.
Application June 20, 1955, Serial No. 516,416
4 Claims. (Cl. 138—64)

This invention relates to an insulated pipe system, particularly as applied to underground installations, although there are certain above ground applications where the principles involved are economical and practical. Also the invention relates particularly to heating or cooling systems but there could be applications outside this field where the principles lend themselves advantageously.

Up to the present time three principal methods have been used to insulate underground pipe systems. The first and oldest method is the construction of a trench, preparation of a concrete slab of one form or another, the installation of pipe lines and their supports upon these slabs, application of preformed or loose insulation and finally an arched tile housing which is usually waterproofed by asphalt and tar felts or membranes. Usually a means of draining off water in the event of leaks is provided. In an effort to reduce installation costs and reduce the number of vulnerable points which may result from poor workmanship, a pre-fabricated type unit was devised. This consists of a length of pipe insulated at the factory with conventional molded pipe insulation, which in turn was then enveloped in a metal conduit for mechanical protection and to prevent moisture infiltration. Since the insulation materials employed in this installation are soft and non-loadbearing, it is required to provide pipe supports of a dense and strong material, which resulted in thermal short circuits. Absorption of moisture by the insulation in shipment and during installation, and undetected pinholes in the assembled conduit ultimately provided a means of deteriorating the system, causing failures which required a large expenditure for replacement. The third method commonly being used is one in which a plastic material such as light-weight aggregate cement is poured around the pipe or pipes after these have been installed on a continuous slab in a conventional manner. After the wooden forms used to pour the insulating aggregate are removed it is necessary to envelope the entire mass in asphalt and roofing felt or membranes. This method is costly and unless the waterproofing operation is without flaws, seepage is likely to occur which eventually permits water to contact the pipe and cause corrosion.

It has become evident over the years to those versed in the art that no fool-proof system has been devised to date for the insulation of underground lines. The shortcomings are inherent as a result of design and available materials. Poor workmanship, faulty construction at time of field installation or during factory fabrication, corrosion of metal housings, absorption of moisture by the insulation cause premature deterioration of the pipe and insulation which require excessive repairs, making the various types of underground installations unsuccessful except where extraordinary precautions in design and close inspection during installation have been put into practice. It should be pointed out that the number of operations and trades involved have contributed greatly to the high installed costs.

Thus the objects of this invention are to provide a new and improved insulation system for underground distribution systems that will be effective, yet relatively economical to provide.

Another object of this invention is to provide a new and improved insulation system for underground distribution systems that will avoid one or more of the inherent disadvantages and limitations of the prior art.

A further object of the invention is to provide a new and improved insulation system for underground distribution systems that will provide for insulation, waterproofing, expansion and contraction and vibration effects in a simple but effective manner.

In order to attain the previous mentioned objectives, the present invention provides intimate contact between insulation and pipe, and between insulation and outer supporting casing, foregoes the use of non-insulating pipe supports, provides resilient flexible gaskets and other means at assembly points to eliminate the possibility of thermal leakages which can deteriorate the outer protection of the insulation and eliminates the accumulation and action of moisture within the insulation thereby preventing deterioration of same.

For a clearer understanding of the invention and objects thereof, reference is made to the accompanying drawings, wherein a particular form of the invention is disclosed by way of example. The following specifications explain the drawings, while the appended claims emphasize the scope of the invention.

In the drawing.

Similar reference characters refer to similar parts throughout the drawings.

Figure 1:
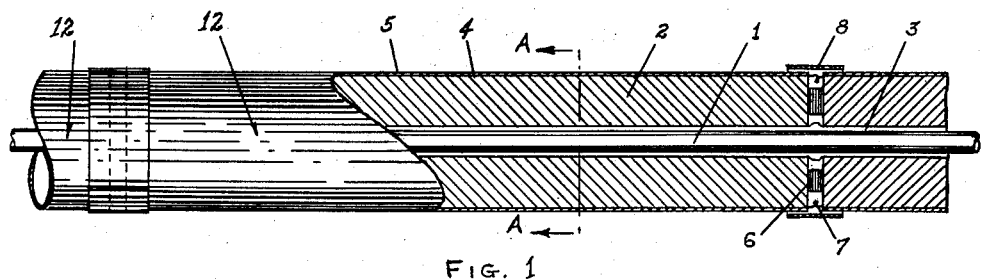
Figure 1 is a plan view of an insulating unit installed on a pipe and coupled to adjacent units embodying this invention showing part in half section and part in full section; the surrounding ground being omitted.
Figure 2A:
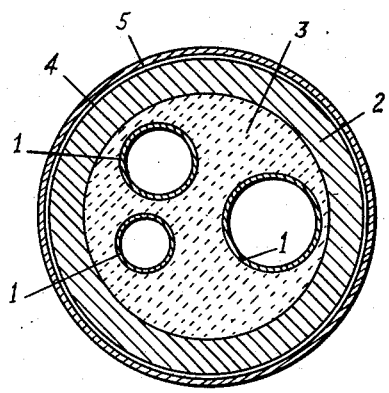
Figure 2a is a transverse section of a pipe section utilizing a plurality of pipe lines.
Figure 2B:
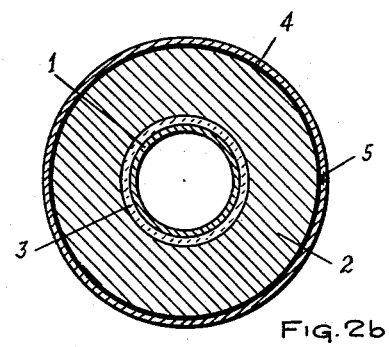
Figure 2b is a transverse section on line A—A of Figure 1 showing a single pipe line.
Figure 3:
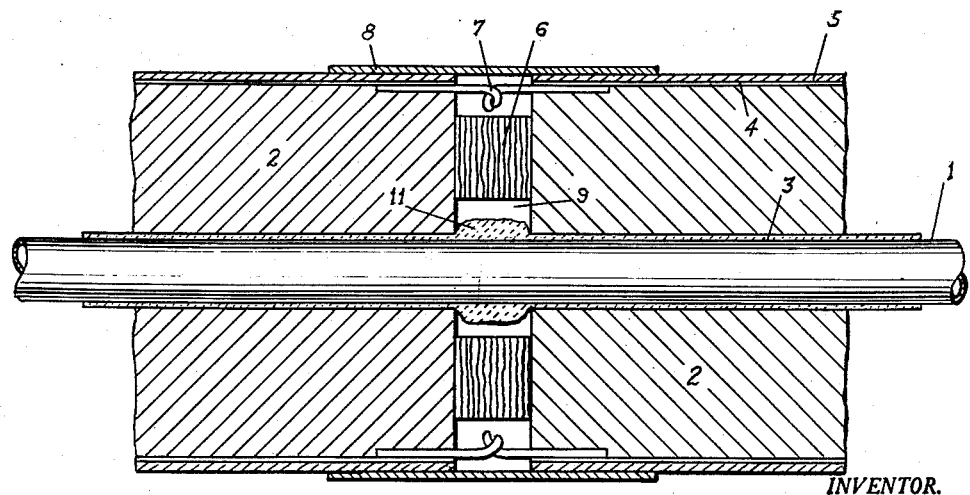
Figure 3 is an enlargement of the joint between two lengths of insulation assembled on pipe lines.

In the drawing a conventional length of pipe 1 in a system used for carrying steam is shown. The various lengths of pipe 1 will be coupled together in any conventional manner after the insulation units 12 are applied. Prior to when this pipe 1 is installed in the system, it is given an outside coating of some suitable material to prevent oxidation and deterioration. The coating is allowed to dry and provides a hard and smooth coating. Then over this length of pipe 1 is slid the required number of cylindrical units of insulation 12 to form a pre-insulated length of pipe. By way of example, a normal 21 foot length of pipe would require two nine foot insulation units or three six foot insulation units, length dependent upon the diameter of pipe and thickness of insulation. The individual lengths of insulation on each length of pipe are joined together before the lengths of pipe are placed in the trench and joined together forming the insulated pipe system. Then after the pipe system is tested the welds are insulated by pre-fabricated sections of insulation. After the steam line is put into service, the material 3 expands on the application of heat, forming a continuous seal between the pipe 1 and insulation 2.

The thermal insulation unit 12 is a cylindrical unit made up of conventional half-sections or whole sections of insulation 2, whichever is more expedient, depending upon the type of insulating material used. This unit is then provided with an outer sheathing 5, an expandible inner lining material 3, resilient end gaskets and coupling devices 7 all hereinafter described in detail. Although any insulating material can be used for the prefabricated unit 12 it is preferable to use a load-bearing material of high compressive strength such as Foamglas manufactured by the Pittsburgh Corning Corp. or Unibestos as manufactured by the Union Asbestos & Rubber Co. Materials of this type preclude the need of pipe supporting devices.

As mentioned above, this unit of insulation 12 is provided with an inner coating of an insulating-waterproofing material 3 which may be one type of material that is capable of expanding on application of heat or another type of material which is capable of expanding by use of a catalytic agent. Even though there are various materials available that meet the requirement, I prefer to use a product manufactured by Dow Corning known as R–7002. R–7002 is a completely formulated, ready-to-use powder that produces heat-stable, non-flammable, low density foamed silicone resin structures. Foams made with Dow-Corning R–7002 have densities from twelve to sixteen pounds per cubic foot. These foams are not thermo-plastic at high temperatures, yet can still be foamed in place. Such a foamed structure made of this material is exceptionally heat-stable, resistant to thermal shock, and has excellent electrical properties. Water absorption after twenty-four hours immersion is in the range of two or three percent. This type of material, as well as other silicone foaming powders are made by the Dow-Corning Corp. of Midland, Michigan, and the details of such form no part of this application. On steam applications it is desirable to provide a high temperature lubricant such as silicone grease between pipe 1 and expansible insulation 3, while on refrigerating systems this detail can be dispensed with. The thickness of this material 3 can be varied to suit individual conditions. It is provided to make and keep the insulation 2 waterproof before installation and, after the steam line is put into use, to seal off all joints and fissures in the insulation 2 wherever and however they may occur due to thermal shocks, faulty insulation techniques, or damage in transit. Another purpose is to fill all voids between pipe 1 and insulation 2 and at the same time accommodate variances in the outside diameter of the pipe due to manufacturing tolerances and expansion and contraction forces as a result of heating or cooling during use. The absence of voids between the pipe 1 and insulation 2 make it impossible for any moisture to find its way to the pipe or heated surfaces of the insulation; and the material 3, after expansion, functions as a continuous custom fitted seal between the above mentioned parts after said parts have assumed their natural states and dimensions at service temperatures.

It is within the scope of this invention to apply the insulating-waterproofing medium 3 to the outside surface of the pipe 1 for expediency and convenience and still keep within the intent and spirit of this invention. Also it is possible to dispense with the insulation 2 and provide extraordinary thickness of medium 3 to achieve the desired results. There are a variety of ways that the insulating-waterproofing element 3 can be expanded, although I wish to rely on the heat of the steam carried through pipe line 1 after same is put into service. However, in the case of units pre-fabricated at a factory this same result can be achieved by the use of steam, electrical heating elements or other heat producing media before installation in the field. In instances where it is not desirable to use an insulation 2 a sheath 5 of sufficient structural strength of similar form may be substituted.

The unit of insulation 12 is also provided at the ends with a collar or gasket 6 of a resilient insulation which will insure a water-tight insulating joint at assembly points. This material can be of heat-resisting flexible foamed materials or fibrous insulations of which there are many available commercially. The gasket 6 in the completed installation also insures a void space 9 between insulation units 12. These voids 9 will provide overflow spaces at frequent intervals which will accommodate overflow 11 of material 3 when a slight excess is used or available due to unusually relative close clearance between pipe 1 and insulation 2. A simple quick-acting mechanical device 7 is provided at the ends of the insulating units to permit quick and easy application and yet provide mechanical strength and permanence to the completed insulation. Another purpose of this fastening device is to put the proper amount of compression into the material 6 to insure proper insulating effects at these joints. A simple and practical means to achieve the desired results can be had by the use of a bayonet type of coupling device, although a snap fastening means could be used also.

To complete the insulating unit a shield or outer covering 5 of any structurally strong material is provided. The insulation 2 and the outer covering 5 are spaced closely together, but a somewhat resilient material adapted to withstand high temperatures, such as a layer of asbestos 4 in one form or another, or in combination with other materials may be employed therebetween. The favorable characteristics of this element 4 permits the insulation 2 to adjust itself to temperature variations when the pipe is carrying a cooled or heated medium without creating undue stress upon the outer structural covering 5, or upon itself, thereby preserving the original properties of the insulation assembly. To complete the installation as set forth previously, a section of material 8 similar to the outer casing 5 is fixed over the joints to make a single integrated unit of the entire series of insulating units.

The above is a description of one method which can be used to achieve the desired results and purpose. This invention is not to be limited by this method alone. The procedure for the carrying out of this invention may be varied slightly in sequence, methods, and materials within the scope and spirit of this invention.

Having described my invention, what I claim as new and desire to secure by Letters Patent is:

1. A preformed insulation unit for insulating a fluid carrying pipe, the inner contours of said unit generally conforming to the outer configuration of the pipe with which it is to be used, expandable means on said inner contours of said unit, being adapted to expand after assembly of said unit upon the pipe to fill any voids therebetween, and an outer sheath surrounding said unit to form a support therefor.

2. An insulation arrangement for a fluid-carrying pipe comprising a plurality of preformed insulation units, each of said units having inner contours generally conforming to the outer configuration of the pipe, expandable means in said inner contours, adapted to expand after assembly of said units upon the pipe to fill any voids therebetween, an annular insulating gasket intermediate each of said units, said gaskets defining an annular overflow space between the gasket and the pipe into which said expandable means may overflow.

3. The insulation arrangement as defined in claim 2 in which mechanical fastening means are provided at the ends of said units to secure adjacent units together in pre-established relation, the respective gaskets between adjacent units being longitudinally compressed as a result of the securing together of said fastening means thereby to create a thermal insulating joint between said units.

4. The insulation arrangement as defined in claim 2 in which each of said units is provided with an outer protective sheath, a resilient, heat resisting element inside said sheath forming a resilient connection between said sheath and said insulation.

References Cited in the file of this patent

UNITED STATES PATENTS

| | | |
|---|---|---|
| 2,410,308 | Schwarwarth | Oct. 29, 1946 |
| 2,532,587 | Williamson | Dec. 5, 1950 |
| 2,545,030 | Isenberg et al. | Mar. 13, 1951 |
| 2,546,533 | Williamson | Mar. 27, 1951 |
| 2,599,210 | Thompson | June 3, 1952 |
| 2,605,202 | Reynolds | July 29, 1952 |
| 2,611,567 | Williamson | Sept. 23, 1952 |
| 2,658,527 | Kaiser | Nov. 10, 1953 |
| 2,707,984 | Goff | May 10, 1955 |